Sept. 8, 1953 G. BOLSEZIAN 2,651,174
SEMICLOSED CYCLE GAS TURBINE PLANT
Filed Oct. 28, 1948

INVENTOR:
GEORGES BOLSEZIAN
BY:

Patented Sept. 8, 1953

2,651,174

UNITED STATES PATENT OFFICE 2,651,174

SEMICLOSED CYCLE GAS TURBINE PLANT

Georges Bolsezian, Paris, France

Application October 28, 1948, Serial No. 56,973
In France November 3, 1947

7 Claims. (Cl. 60—39.18)

1

This invention relates to a semi-closed cycle gas turbine plant wherein the fluid of the closed part of the cycle is heated by the radiant heat of the combustion gas, and has for its object to have in the closed part of the cycle a clean fluid which cannot foul the compressors and the heat exchangers.

According to the invention there are formed in the heater two parallel layers of fluid the first of which is formed by combustion gas and the second of which is formed by a clean fluid, said layers remaining in direct mutual contact, with the formation of a mixed zone only at their contact boundary, the second, clean layer being heated by the radiant heat of the first layer, through radiant heat absorbing elements placed in the second layer, and at least the greatest part of the unmixed fluid of the second layer being separated again, after heating, to pass into the closed part of the cycle.

Other objects of the invention will appear in the following specification and the accompanying drawing, which represents by way of example two embodiments of the invention and detail modifications thereof.

Figure 1:
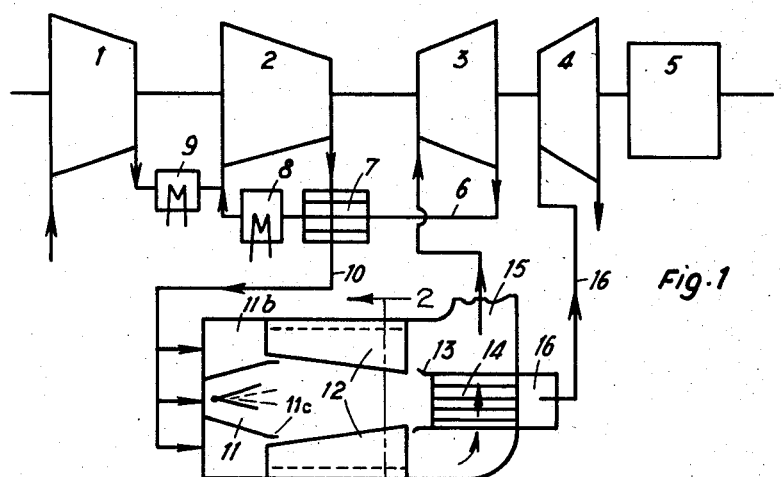
Fig. 1 represents schematically a first embodiment of the plant according to the invention.

The embodiment shown on Fig. 1 is a semi-closed cycle gas turbine plant in which an atmospheric air charging compressor 1, a cycle compressor 2, a cycle turbine 3, an extraction turbine 4 and a receiver of useful work 5, for example a generator, are mounted on a common shaft. The exhaust, which in this embodiment is pure air and which leaves the closed cycle turbine 3 with a pressure higher than the atmospheric pressure, passes through the conduit 6, through a heat recuperator 7 and a cycle cooler 8, and is again compressed to the working pressure by the cycle compressor 2, simultaneously with the air delivered by the atmospheric air charging compressor 1, the output of which, after passing through an interstage cooler 9, is mixed at the same pressure with the exhaust fluid of the closed cycle. The fluid compressed by the compressor 2 passes first through the heat recuperator 7, where it is heated by the exhaust

Figure 2:
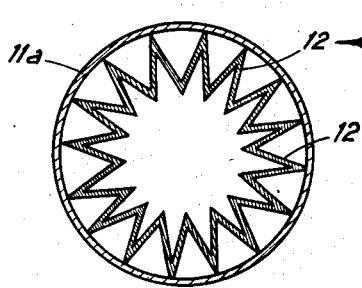
Fig. 2 represents a cross section of the heating surfaces of the plants of Figs. 1 and 3 taken on the line 2—2 of Fig. 1.
Figure 2A:
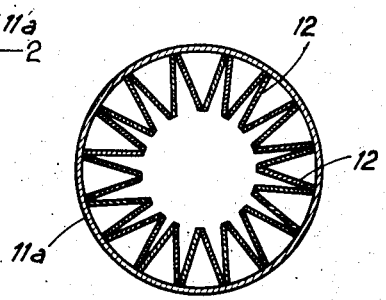
Fig. 2a represents a cross section similar to Fig. 2 showing a modified arrangement of the heating surfaces.

2 fluid of the cycle turbine 3. It passes then through a conduit 10 and is divided into two parts. The first part of the compressed fluid enters the combustion chamber 11 where it causes the combustion of the fuel and the resulting combustion gas is discharged through the outlet 11c of the combustion chamber 11 into the intake of the radiation heater 11a formed by a single conduit, in which said combustion gas forms a first, central layer of hot gas. The second part of the compressed fluid is led through a passage 11b surrounding the combustion chamber 11 and emerges into the intake of the radiation heater 11a in which it forms a second layer, around said first layer. The outlet of the passage 11b has a common wall with the outlet 11c of the combustion chamber 11, so that the combustion chamber 11 and the passage 11b form two parallel fluid inlet conduits at the intake of the heater 11a. Said first and second layers are parallel to one another and in direct contact with each other, and they mix partially only at the zone of their contact boundary. Said second layer is heated by radiant heat transmission, by elements 12 placed in the heater 11a, behind the passage 11b. These elements 12 absorb the radiant heat of the combustion gases of said first layer and transmit it to the compressed air forming said second layer in which they are placed, so that it impinges them on their two faces. Figs. 2 and 2a show cross sections of two embodiments of the heat exchanger formed by the elements 12. The inlet of the combustion chamber 11 is so dimensioned that the quantity of fluid entering the combustion chamber 11 and consequently the quantity of combustion gas forming said first layer is less than the delivery of the charging compressor 1. The surplus of the delivery of the compressor 1 over the quantity of compressed air passing through the combustion chamber 11 passes through the passage 11b surrounding the combustion chamber, together with the fluid of the closed cycle, to form said second layer in the heater 11a.

An outlet conduit means 13 mounted at the exit of the heater 11a removes from the cycle a quantity of fluid which is led through a conduit 16 and actuates one or more extraction turbines 4. The remaining fluid leaves the heater 11a through other outlet conduit means 15 and actuates one or more closed cycle turbines 3. The intake opening of the outlet conduit means 13 faces the outlet 11c of the combustion chamber 11 and is so dimensioned with respect to the cross section of said outlet 11c, taking into account the contraction of said first layer of combustion gas through heat transmission to said second layer, that the outlet conduit means 13 collects the whole of said first layer of combustion gas and at least the whole of said mixed zone at the contact boundary between the two layers, while the unmixed fluid of said second layer, which in this embodiment is pure air, remains out of the outlet conduit means 13 and passes through the other outlet conduit means 15 into the closed part of the cycle. The size of the intake opening of the outlet conduit means 13 is also such that the quantity of fluid removed from the cycle through said outlet conduit means 13 is substantially equal to the quantity of fluid delivered by the charging compressor 1 and introduced into the cycle.

Eventually, a part of the pure air heated by the elements 12 absorbing the radiant heat of the combustion gases may be heated further by conducting surfaces 14 mounted in series with the elements 12 and traversed by the combustion gases.

Figure 3:
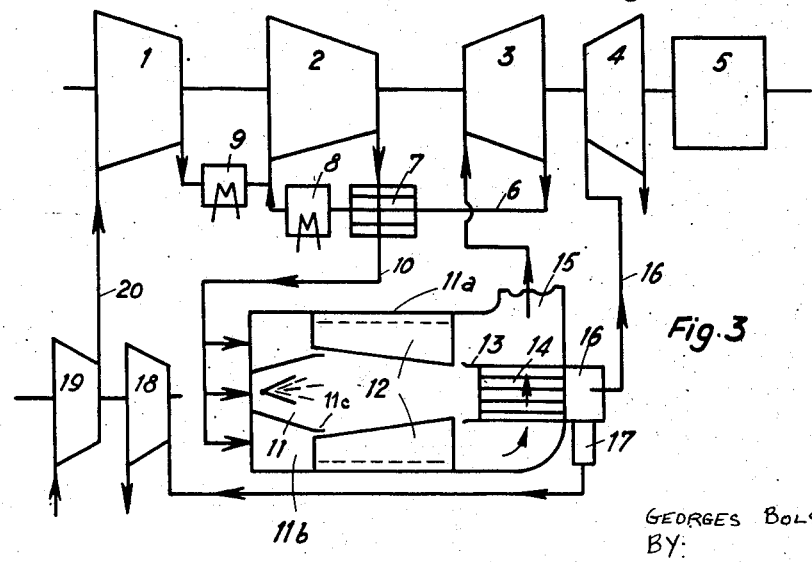
Fig. 3 represents schematically a second embodiment of the plant according to the invention.

According to another embodiment represented in Fig. 3, in which the same elements are designated by the same reference numerals as in Fig. 1, the fluid removed from the cycle passes also through a branch conduit 17 and thus actuates the extraction turbine 4 as well as a separate extraction turbine 18 coupled with a preliminary atmospheric air charging compressor 19 which feeds the charging compressor 1 mounted on the same shaft as the cycle compressor 2. The group 1, 2, 3, 4, 5 rotates at constant speed, and the group 18, 19 at variable speed.

Figs. 2 and 2a represent cross sections of the elements 12 which absorb the radiant heat of the gases and transmit it to the air. These elements 12, which may be constituted by continuous metal sheets (Fig. 2) or by separate plates (Fig. 2a), form a star shaped corrugated surface around the combustion gases and they are impinged on their two faces by the compressed air.

I claim:

1. In a semi-closed cycle gas turbine plant having at least a cycle compressor, a radiation heater, at least a cycle turbine, a heat recuperator and a cycle cooler, through which a fluid circulates in a closed cycle in the order cited, and which has a combustion chamber with an outlet discharging combustion gas into said heater, at least an atmospheric air compressor for charging the cycle and at least an extraction turbine for extracting fluid from the cycle, the improvement in its fluid heating and fluid distributing means which includes two parallel fluid inlet conduits at the intake of said radiation heater, the first of said inlet conduits being formed by said combustion chamber into which one part of the fluid is introduced to burn the fuel and from which the combustion gas is discharged into said heater to form therein a first layer of hot fluid, the second of said inlet conduits discharging fluid directly into said heater to form therein a second layer of fluid which is parallel to said first layer and which remains in direct contact with said first layer, the fluids of said two layers being partially mixed only at the zone of their contact boundary, radiant heat absorbing elements placed in said heater behind said second inlet conduit, substantially in said second layer and parallel to its flow, said elements being arranged to absorb the radiant heat of said first layer and to heat the fluid of said second layer on their two faces through heat transmitting contact therewith, conduit means at the exit of said heater after said radiant heat absorbing elements, said conduit means having an intake opening facing said outlet of the combustion chamber and so dimensioned with respect to the cross section of said outlet of the combustion chamber that at least the greatest part of the unmixed fluid of said second layer remains out of said conduit means, and other conduit means at the exit of said heater for passing the unmixed fluid of said second layer into the cycle turbine.

2. A semi-closed cycle gas turbine plant having at least a cycle compressor, a radiation heater, a cycle turbine, a heat recuperator and a cycle cooler, through which a fluid circulates in a closed cycle in the order cited, and which has a combustion chamber with an outlet discharging combustion gas into said heater, an atmospheric air charging compressor delivering fluid to the cycle compressor and an extraction turbine for extracting fluid from the cycle, two parallel inlet conduits at the intake of said radiation heater and another conduit between the cycle compressor and the radiation heater, said last mentioned conduit discharging compressed fluid into said two inlet conduits, the first of said inlet conduits being formed by said combustion chamber in which fuel is burned and from which the combustion gas flow is discharged into said heater, and the second of said inlet conduits being formed by a conduit located around said combustion chamber and through which the fluid to be heated flows into said heater, the outlet of said second inlet conduit having a common wall with said outlet of the combustion chamber, the flow of combustion gas and the flow of fluid to be heated forming in said heater two parallel layers of fluid which remain in direct contact with each other and are partially mixed only at the zone of their contact boundary, radiant heat absorbing elements placed in said heater behind said second inlet conduit, substantially in said second layer and parallel to its flow, said elements being arranged to absorb the radiant heat of the combustion gas of said first layer and being in heat exchange relation on their two faces with the fluid of said second layer, outlet conduit means at the exit of said heater, after said radiant heat absorbing elements, said outlet conduit means being in communication with said extraction turbine and having an intake opening in said heater, said intake opening facing said outlet of the combustion chamber and being so dimensioned with respect to the cross section of said outlet of the combustion chamber as to collect at least the totality of the combustion gas, and another outlet conduit means at the exit of said heater to pass the fluid remaining out of said first outlet conduit means into the cycle turbine.

3. A semi-closed cycle gas turbine plant having at least a cycle compressor, a radiation heater, a cycle turbine, a heat recuperator and a cycle cooler, through which a fluid circulates in a closed cycle in the order cited, and which has a combustion chamber with an outlet discharging combustion gas into said heater, an atmospheric air compressor for charging the cycle and an extraction turbine for extracting fluid from the cycle, said radiation heater being formed by a single conduit, two parallel inlet conduits at the intake of said single conduit, the first of said inlet conduits being formed by said combustion chamber, and the second of said inlet conduits forming the inlet passage of the fluid to be heated in said single conduit, another conduit leading from the outlet of said cycle compressor to said first and second inlet conduits and feeding said inlet conduits, the combustion gas discharged from said combustion chamber into said single conduit forming therein a first layer of fluid, and the fluid to be heated discharged through said second inlet conduit into said single conduit forming therein a second layer parallel to said first layer and in direct contact therewith, the fluids of said two layers being partially mixed only at the zone of their contact boundary, radiant heat absorbing elements in said single conduit, said elements being placed behind said second inlet conduit, substantially in said second layer and parallel to its flow, said elements being arranged to absorb the radiant heat of the combustion gas of said first layer and to heat the fluid of said second layer on their two faces through heat transmitting contact therewith, two outlet conduit means at the exit of said single conduit, the first of said outlet conduit means facing said outlet of the combustion chamber and being in communication with said extraction turbine, and the second of said outlet conduit means being in communication with said cycle turbine, said first outlet conduit means being arranged to divide again said two layers in two separate flows, the first of said flows comprising at least the whole of the combustion gas and passing in said first outlet conduit means, and the second of said flows comprising at least the greatest part of the unmixed fluid of said second layer and passing in said second outlet conduit means.

4. A semi-closed cycle gas turbine plant having at least a cycle compressor, a radiation heater, a cycle turbine, a heat recuperator and a cycle cooler, through which a fluid circulates in a closed cycle in the order cited, and which has a combustion chamber with an outlet discharging combustion gas into said heater, an atmospheric air compressor for charging the cycle and an extraction turbine for extracting from the cycle a quantity of fluid substantially equal to the delivery of said air charging compressor, two parallel inlet conduits at the intake of said radiation heater which discharge two parallel flows of fluid into said heater, the first of said inlet conduits being formed by said combustion chamber and having an inlet so dimensioned that a quantity of fluid less than the delivery of said air charging compressor is introduced into said combustion chamber to burn the fuel and from which the resulting combustion gas is discharged into said heater to form therein a first layer of hot fluid, the second of said inlet conduits leading fluid directly into said heater to form therein a second layer of fluid which remains in direct contact with said first layer, the fluids of said two layers being mixed partially only at the zone of their contact boundary, radiant heat absorbing elements placed in said heater behind said second inlet conduit, substantially in said second layer and parallel to its flow, said elements being arranged to absorb the radiant heat of said first layer and to heat the fluid of said second layer on their two faces through heat transmitting contact therewith, conduit means at the outlet of said heater after said radiant heat absorbing elements, said conduit means having an intake opening facing said outlet of the combustion chamber and so dimensioned with respect to the cross section of said outlet of the combustion chamber as to separate from said two layers a quantity of fluid substantially equal to the delivery of said air charging compressor and comprising the whole of the combustion gas and a fraction of fluid of said second layer heated through heat transmission, to pass them into said extraction turbine, and other conduit means at the outlet of said heater for passing the remaining unmixed fluid of said second layer into the cycle turbine.

5. A semi-closed cycle gas turbine plant as claimed in claim 1, in which a conduction heat exchanger for heating the fluid is placed in series with said radiation heater.

6. A semi-closed cycle gas turbine plant as claimed in claim 2, in which said radiant heat absorbing elements form a star shaped body in said heater.

7. A semi-closed cycle gas turbine plant as claimed in claim 1, having its atmospheric air charging compressor divided in two separate air charging compressors and having its extraction turbine divided in two separate extraction turbines, the first of said two air charging compressors forming a mechanically independent group with one of said extraction turbines and being driven by it, and the second of said two air charging compressors being mechanically connected with said cycle compressor on the same shaft, driven together with said cycle compressor and disposed in series with the first of said two air charging compressors.

GEORGES BOLSEZIAN.

References Cited in the file of this patent

UNITED STATES PATENTS

| Number | Name | Date |
| --- | --- | --- |
| 2,298,663 | Traupel | Oct. 13, 1942 |
| 2,341,490 | Traupel | Feb. 8, 1944 |
| 2,454,358 | Traupel | Nov. 23, 1948 |

FOREIGN PATENTS

| Number | Country | Date |
| --- | --- | --- |
| 212,104 | Switzerland | Feb. 3, 1941 |
| 212,269 | Switzerland | Feb. 17, 1941 |
| 228,271 | Switzerland | Nov. 1, 1943 |
| 844,442 | France | Apr. 24, 1939 |